United States Patent [19]
Godfrey et al.

[11] Patent Number: 5,433,610
[45] Date of Patent: Jul. 18, 1995

[54] EDUCATIONAL DEVICE FOR CHILDREN

[76] Inventors: Joe Godfrey; Connie Godfrey, both of 12005 Garnet Dr., Clermont, Fla. 34711

[21] Appl. No.: 260,804

[22] Filed: Jun. 16, 1994

[51] Int. Cl.⁶ ............................................. G09B 5/00
[52] U.S. Cl. ................................ 434/169; 434/308; 446/397
[58] Field of Search ............... 434/118, 169, 178, 185, 434/307 R, 308, 317; 446/297, 397; 341/34; 84/615, 618, 653, 656, 678, 684; 200/5 R, 5 A

[56]         References Cited
         U.S. PATENT DOCUMENTS

| | | | |
|---|---|---|---|
| 4,358,278 | 11/1982 | Goldfarb | 434/169 X |
| 4,403,966 | 9/1983 | Yang | 434/169 X |
| 4,465,465 | 8/1984 | Nelson | 434/308 X |
| 4,804,328 | 2/1989 | Barrabee | 434/308 |
| 4,980,919 | 12/1990 | Tsai . | |
| 4,997,374 | 3/1991 | Simone | 434/178 X |
| 5,145,447 | 9/1992 | Goldfarb | 446/397 X |
| 5,209,665 | 5/1993 | Billings et al. | 434/169 |
| 5,254,007 | 10/1993 | Eagan | 446/397 X |
| 5,277,588 | 1/1994 | Lin | 434/169 X |

FOREIGN PATENT DOCUMENTS

| | | | |
|---|---|---|---|
| 0578486 | 1/1994 | European Pat. Off. | 446/397 |
| 5115613 | 5/1993 | Japan | 446/397 |

*Primary Examiner*—Joe H. Cheng
*Attorney, Agent, or Firm*—Walter F. Wessendorf, Jr.

[57]              ABSTRACT

An educational device for children to accelerate learning from recognition, language acquisition, awareness of cause and effect, and association. The device houses discrete photos environmentally people, animals and/or inanimate objects, recognizable to the child, with each photo being operatively connected to a discrete prerecorded message, such that, upon a photo being pressed, the discrete and corresponding pre-recorded message is played. The child's learning is accelerated by repetitive use of the device.

3 Claims, 16 Drawing Sheets

FIG. 6 BILLY 21
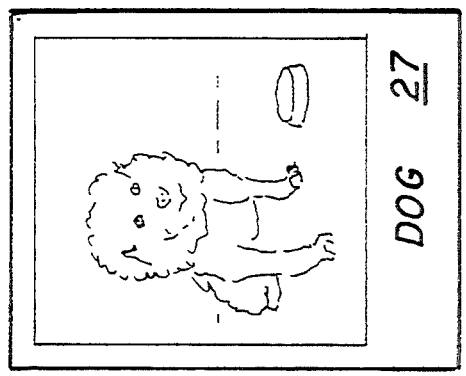
FIG. 9 DOG 27
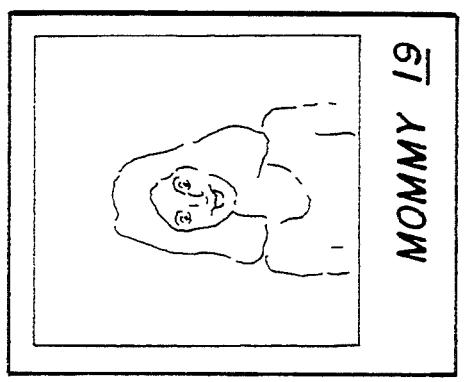
FIG. 5 MOMMY 19
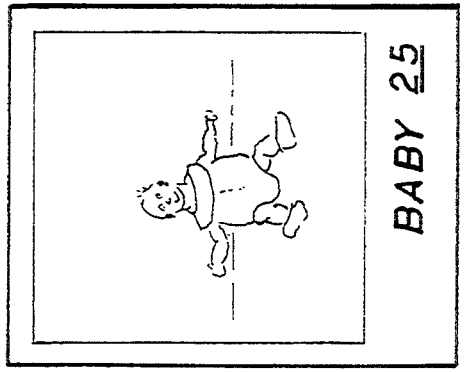
FIG. 8 BABY 25
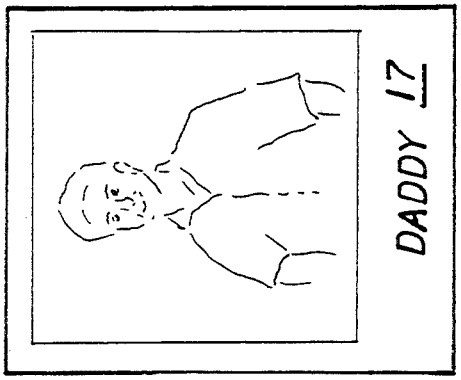
FIG. 4 DADDY 17
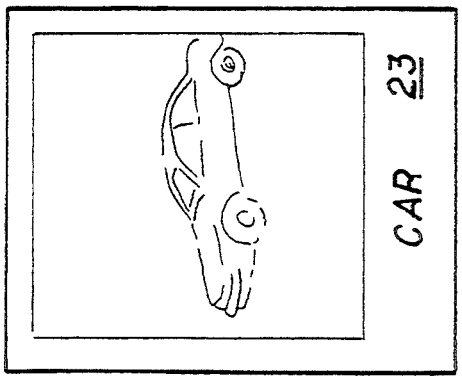
FIG. 7 CAR 23

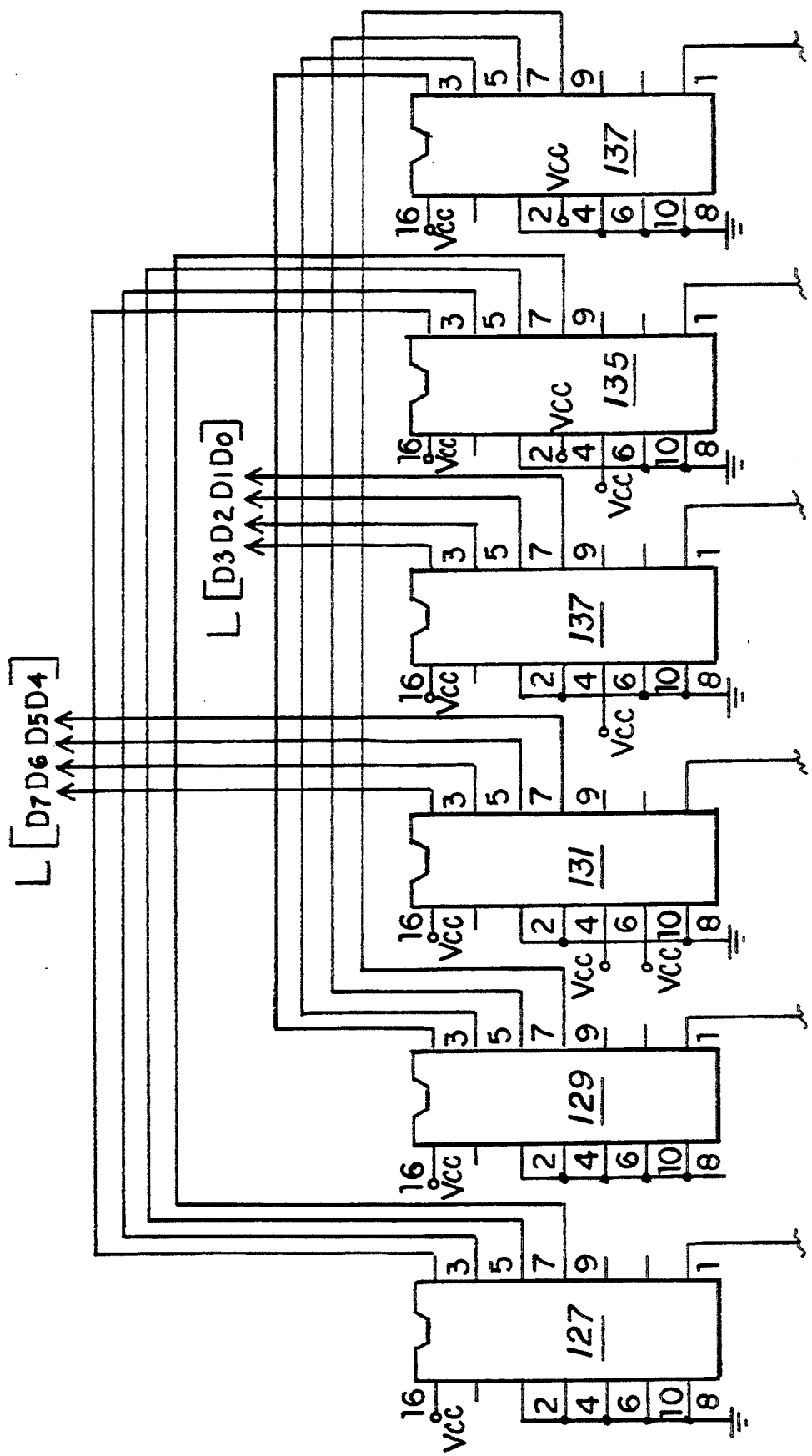

EDUCATIONAL DEVICE FOR CHILDREN

BACKGROUND

1. Technical Field

This device relates to an educational device for children.

2. Background

The problems in the art to which this invention apetrains are the needs for accelerating a child's recognition, language acquisition, awareness of cause and effect, and association. A child, in the first few days of his life, is referred to as a "newborn"; up to one year, as a "baby"; 1-2½ years, as a "toddler"; and 2½-5 years, as a "pre-schooler". With the exception of the age definition for "newborn", "child" in this patent application includes all of the foregoing age definitions. In this patent application, "recognition" means the ability of the child to look at a photograph and visually remember the person, animal or inanimate thing in the photograph. Recognition also means the ability to hear a voice or a sound and to distinguish the one from the other. "Language acquisition" means to learn the meaning, sound and pronunciation of a particular word after hearing the word repeated time after time again, thus adding words or language to the child's vocabulary. "Awareness of cause and effect" means for the child to realize that when an action is made the resulting reaction will happen and be the same time and time again. "Association" means for the child to relate the name or word that goes with a person, animal or inanimate thing, to the actual physical thing that it is. A child, as young as three months of age, is capable of recognizing very familiar voices and faces. By four to six months, a child can learn to recognize and distinguish one person's voice and/or face from another's by looking and listening; that the more spoken language a child hears, the sooner the child will begin to speak; that awareness of cause and effect begins to emerge in a child as young as nine months of age; and that it is important to verbally label people, animals or inanimate things in a child's environment to help the child associate the words, voices, names and sounds with the person, animal or inanimate thing to which it corresponds.

SUMMARY OF THE INVENTION

This invention-contributes to the solutions of the discussed problems of the art by providing an educational device for children by means of which a child's recognition, language acquisition, awareness of cause and effect, and association can be accelerated. The device houses multiple discrete photographs or photos, environmentally depicting people, animals and inanimate things (as, for example, the child's own bottle), recognizable to the child. Each photo is operatively connected to a discrete pre-recorded message. Upon pressing a photo, a discrete and corresponding pre-recorded message is played. The repeated use of the device accelerates the child's learning in relation to recognition, language acquisition, awareness of cause and effect, and association.

This invention solves the problem of accelerating a child's recognition because the child will learn to recognize people, animals or inanimate things by seeing the photos displayed in the device repeatedly. The child will also learn to recognize a particular voice or sound by hearing it when one of the corresponding photos is pressed. The invention solves the problem of accelerating a child's language acquisition because the child learns new words by hearing them repeated over and over. When a message is recorded in the device, it can be played back over and over again by simply pressing the same photo. By hearing the message repeatedly, the child will be able to learn the words which are recorded in the device, thus adding words to the child's vocabulary. The invention solves the problem of accelerating the child's awareness of cause and effect because the repeated pressing of the discrete photos by the child's parent, operatively resulting in the playbacks of the corresponding pre-recorded messages, will enable the child to develop an expanded awareness of cause and effect to the extent that the child will begin to understand that, if the child himself presses the same photo, the same corresponding pre-recorded voice message will be played. Hence, eventually the child will be induced to take it upon himself to begin pressing the photos and thereby accelerate his awareness of cause and effect. The invention solves the problem of accelerating the child's association because, when a photo is pressed, its corresponding pre-recorded message will play. The child will hear the words, voices and/or sounds and see the photo that was pressed, thus establishing a direct relationship of the photo to the pre-recorded message. After repeated use, the child will begin to associate the words, voices and/or sounds with the photo, thus accelerating the child's association. The rate of acceleration of a child in learning recognition, language acquisition, awareness of cause and effect, and association greatly depends upon the amount of time the child is subjected to and uses the device, and the learning capabilities of the child. The message-record feature of the device is unique in that the voices in the pre-recorded voice messages to be played will be the voices of people the child knows and such voices will become increasingly more familiar to the child after repeated use of the device. The device further allows any or all of the original photos to be simply removed and replaced with new and different photos, as well as new discrete voice messages being correspondingly recorded to maintain direct teaching relationships with the new photos.

The synergistic effect from the accelerating and compounding interplay from the four factors of recognition, language acquisition, awareness of cause and effect, and association could easily accelerate the learning of a nine-months-old baby, to the degree that he starts pressing the photos by himself; and, in some cases, at the age of five to six months.

BRIEF DESCRIPTION OF THE DRAWINGS

These objects and other objects of the invention should be discerned and appreciated from the DETAILED DESCRIPTION OF THE PREFERRED EMBODIMENT, taken in conjunction with the drawings, wherein like reference numerals refer to similar parts, elements and components throughout the several views, in which:

FIGS. 4-9 depict sample photos;

FIG. 13A and FIG. 13B is a diagram for the address 1 and latch keyboard buttons 33, 35, 37;

DETAILED DESCRIPTION OF THE PREFERRED EMBODIMENT

Figure 1:
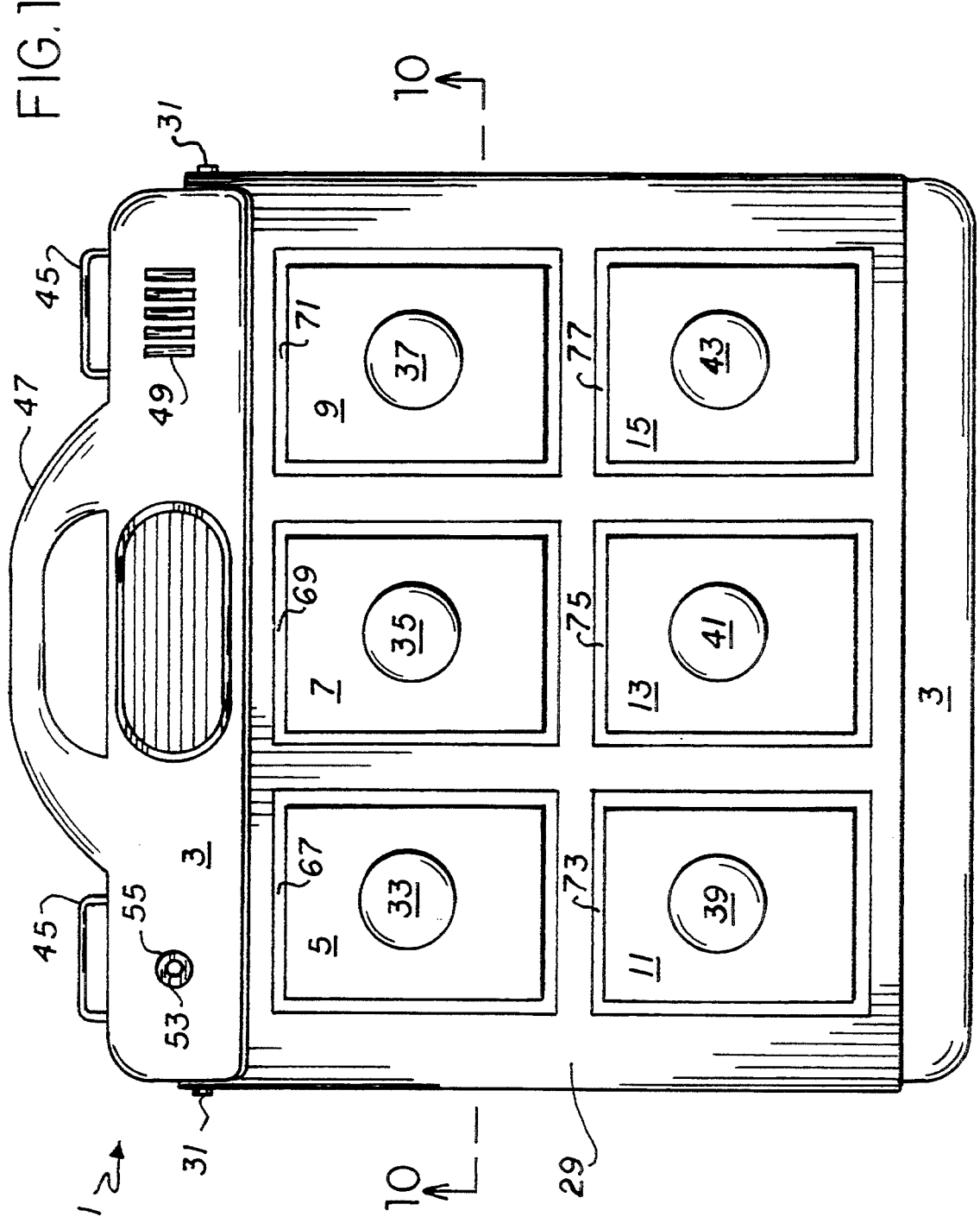
FIG. 1 is a top plan view of the device.

In FIG. 1 of the drawings, reference numeral 1 generally refers to the invention of the educational device for children. A main body 3, of plastic material, houses therein electrical/electronic components of the device 1 by suitable conventional means (not shown). Upstanding from the main body 3 are raised picture wells 5, 7, 9, 11, 13 and 15, shown more discernably in FIG. 3, and which receive therein by emplaced relationship thereon photos 17, 19, 21, 23, 25 and 27, respectively (see FIGS. 4–9). A picture retaining cover 29, of plastic material, by means of lateral hinges 31 cooperating with the main body 3, function to allow the cover 29 to be opened, and closed upon the picture wells 5, 7, 9, 11, 13 and 15 to retain the respective photos 17, 19, 21, 23, 25 and 27, so emplaced. For example, photo 17 in its picture well 5 can be replaced by a different photo by simply raising the cover 29 sufficiently to gain manipulative access to the picture well 5 to remove photo 17 therefrom, and to emplace the different photo in the picture well 5 and simply close the cover 29. Soft touch buttons 33, 35, 37, 39, 41 and 43 are mounted in the respective picture wells 5, 7, 9, 11, 13 and 15, as will be described. Fixedly carried by the main body 3, by conventional means (not shown), are conventional strap holders 45 to enable the device 1 to be strapped to conventional side rails of a crib (not shown). The top portion of the main body 3 defines a handle 47 to enable the device 1 to be hand-carried. Access slots 49, through the main body 3, provide sound-wave access to an interiorly housed microphone to be described. Access slots 51, through the main body 3, provide sound-wave access from an interiorly housed speaker to be described. A recess 53 within the main body 3 complementally receives therein by interference fit and thereby mounts a light-emitting-diode (LED) 55.

Figure 2:
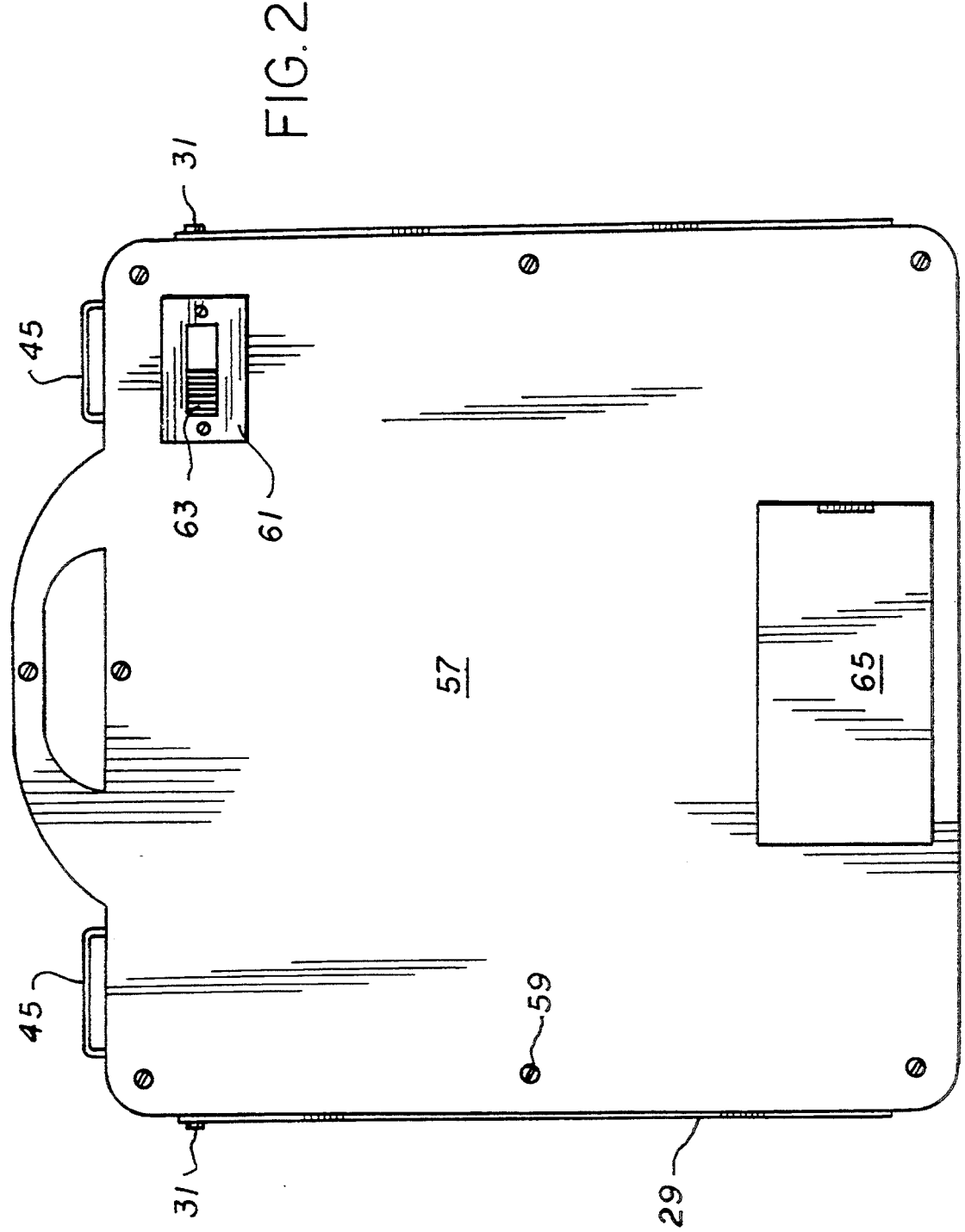
FIG. 2 is a rear view of the device shown in FIG. 1.

In FIG. 2, a backing plate 57, of plastic material, complemental with the main body 3 is affixed to the main body 3 by perimeter screws 59. A recess 61, formed in the backing plate 57, retains, by interference fit therewith, a record/play switch 63, which is purposefully located thereat to prevent a child from "playing" with the switch 63. An access cover 65, conventionally mounted and removable, provides access to a power supply to be described.

Figure 3:
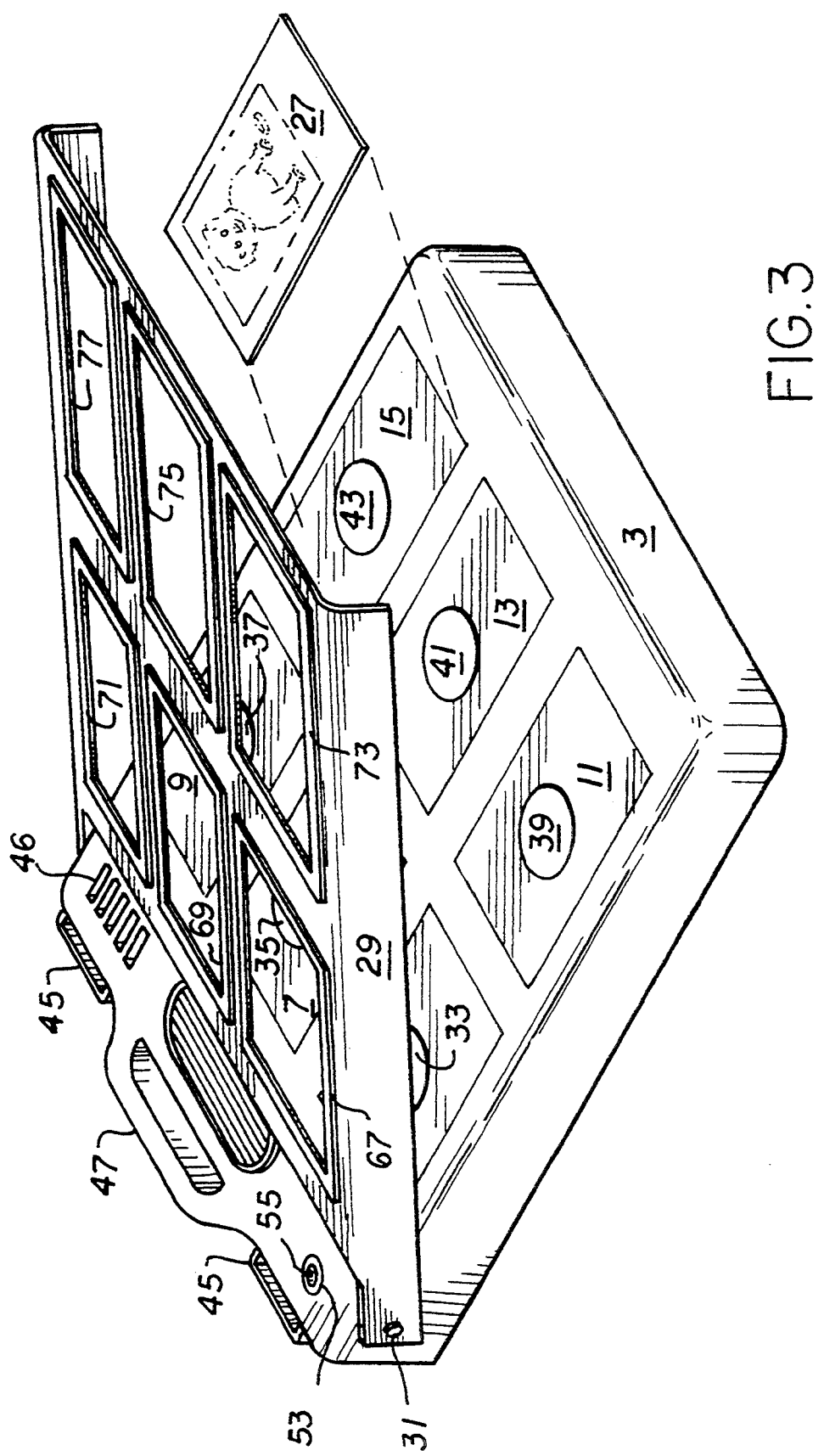
FIG. 3 is a perspective view of the main body with its raised picture wells and picture retaining cover.

In FIG. 3, the picture retaining cover 29 is shown in a half-open position to best show its functional attributes to enable a human operator to emplace photo 27 within raised picture well 15, following which the picture retaining cover 29 would then be closed to hold photo 27 in place. As shown, retaining cover 29 has discrete openings, whose perimeters are defined by rims 67, 69, 71, 73, 75 and 77, in complemental relationship with respective picture wells 5, 7, 9, 11, 13 and 15. The rims 67, 69, 71, 73, 75 and 77 are sufficiently less, dimensionally, than their respective picture wells 5, 7, 9, 11, 13 and 15, such that, upon the cover 29 being closed, the rims 67, 69, 71, 73, 75 and 77 physically retain the perimeters of the respective photos 17, 19, 21, 23, 25 and 27, emplaced within their respective picture wells 5, 7, 9, 11, 13 and 15.

FIGS. 4–9 depict sample photos that can be used by the human operator. Each photo has, corresponding therewith, its own discrete pre-recorded voice message playback. FIG. 4 depicts photo 17 which is a picture of the child's daddy. The child's daddy places photo 17 within the raised picture well 5 and closes the picture retaining cover 29. Daddy places switch 63 into its record position, then presses photo 17 to close the circuit via soft touch button 33, thereby starting the recording process. Thereupon, daddy speaks into the microphone to record a message, such as: "Hey baby it's daddy, can you say daddy? You sure are a good baby!", following which switch 63 is disposed in its play position and the device is ready to play. Thereupon, a daddy (and eventually the child) presses photo 17 with the child seeing the picture of daddy, seeing daddy in person and hearing daddy's pre-recorded voice message being played back. If a POLAROID photo is used, the word "daddy" can also be written on the bottom of the photo for the child to see. FIG. 5 depicts photo 19 which is a picture of the child's mommy. Mommy records a message such as: "Hey baby, I'm your mommy. Can you say mommy? I sure do love you.", FIG. 6 depicts photo 21 which is a picture of the child's brother. The child's brother records a message such as: "I'm your brother Billy. I can't wait until you learn to say my name, Billy.". FIG. 7 depicts a picture of the family car. Daddy or mommy records a message such as: "This is our car. We use the car to drive around. Can you say, car?". FIG. 8 depicts a picture of the child. Daddy or mommy records a message such as: "Look baby! It's a picture of you. Can you say, baby? I know you can.". FIG. 9 depicts a picture of the family dog. Daddy or mommy records a message such as: "This is our dog. The dog says woof, woof, woof. Can you say dog?". As the child progresses in his learning capability, the photos will be replaced with new photos commensurate with the child's progress, together with new discrete and corresponding messages being recorded, to further accelerate the child's learning. The synergistic effect from the accelerating and compounding interplay from the child's recognition, language acquisition, awareness of cause and effect, and association will beneficially further accelerate the baby's learning to the degree that, at the age of five to nine months, the baby will start pressing the photos to hear the pre-recorded messages, with the result that the baby himself will be utilizing the device to teach himself.

Figure 10:
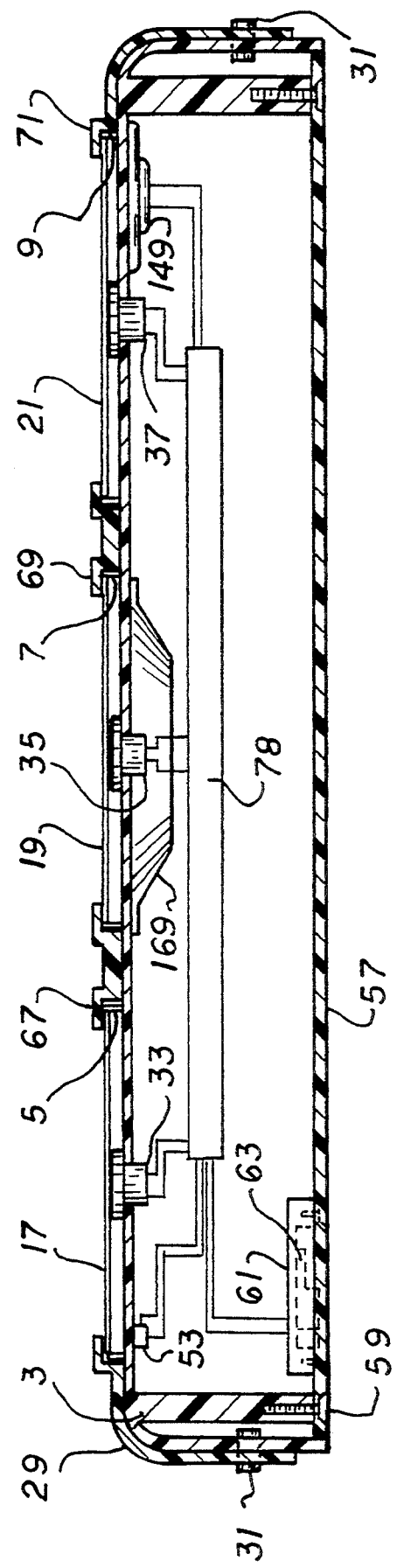
FIG. 10 is a cross-sectional view, taken in the direction of the arrows 10—10 in FIG. 1.

FIG. 10 shows a circuit board 78, conventionally carried by the main body 3, for the various electrical/e- lectronic components to be described; shows the edges of the rims 67, 69 and 71, closed around their respective picture wells 5, 7 and 9 to keep respective pictures 17, 19 and 21 in place. The soft touch buttons 33, 35 and 37 are shown mounted in the centers of their respective 5 raised picture wells 5, 7 and 9 of the main body 3.

Figure 11:
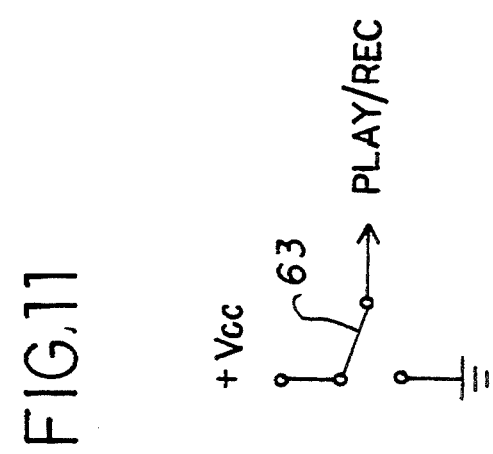
FIG. 11 is a diagram for the play/record components.

For recording, a human operator disposes the record/play switch 63, shown in FIG. 11, to its record position. With the photos 17, 19, 21, 23, 25 and 27 emplaced within their respective raised picture wells 5, 7, 9, 11, 13 and 15, one of the photos 17, 19, 21, 23, 25 or 27 is pressed, thereby closing the circuit by contact with its respective soft touch button 33, 35, 37, 39, 41 or 43.

Figure 12:
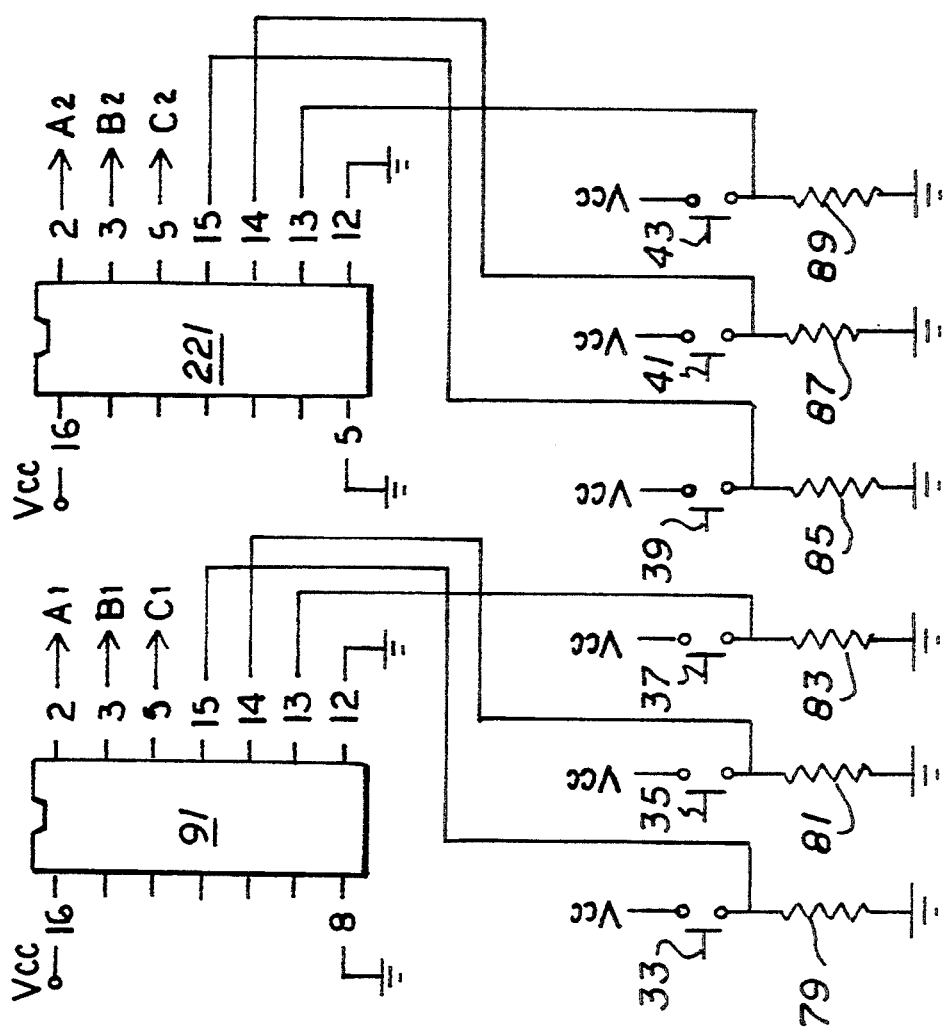
FIG. 12 is a diagram for the buttons 33, 35, 37, 39, 41 and 43.

Components 33, 35, 37, 39, 41 and 43; and components 79, 81, 83, 85, 87 and 91, to be described, are shown in FIG. 12. Button component 33 is connected to a 2.2 k-ohm/¼-watt/5% tolerance resistor 79 and grounded; button component 35 is connected to a 2.2 k-ohm/¼-watt/5% tolerance resistor 81 and grounded; button component 37 is connected to a 2.2 k-ohm/¼-watt/5% tolerance resistor 83 and grounded; button component 39 is connected to a 2.2 k-ohm/¼-watt/5% tolerance resistor 85 and grounded; button component 41 is connected to a 2.2 k-ohm/¼-watt/5% tolerance resistor 87 and grounded; and button component 43 is connected to a 2.2 k-ohm/¼-watt/5% tolerance resistor 89 and is grounded. For button components 33, 35 and 37, when the circuit is closed, the signal goes into a 7442 one-of-ten decoder 91.

Figure 13B:
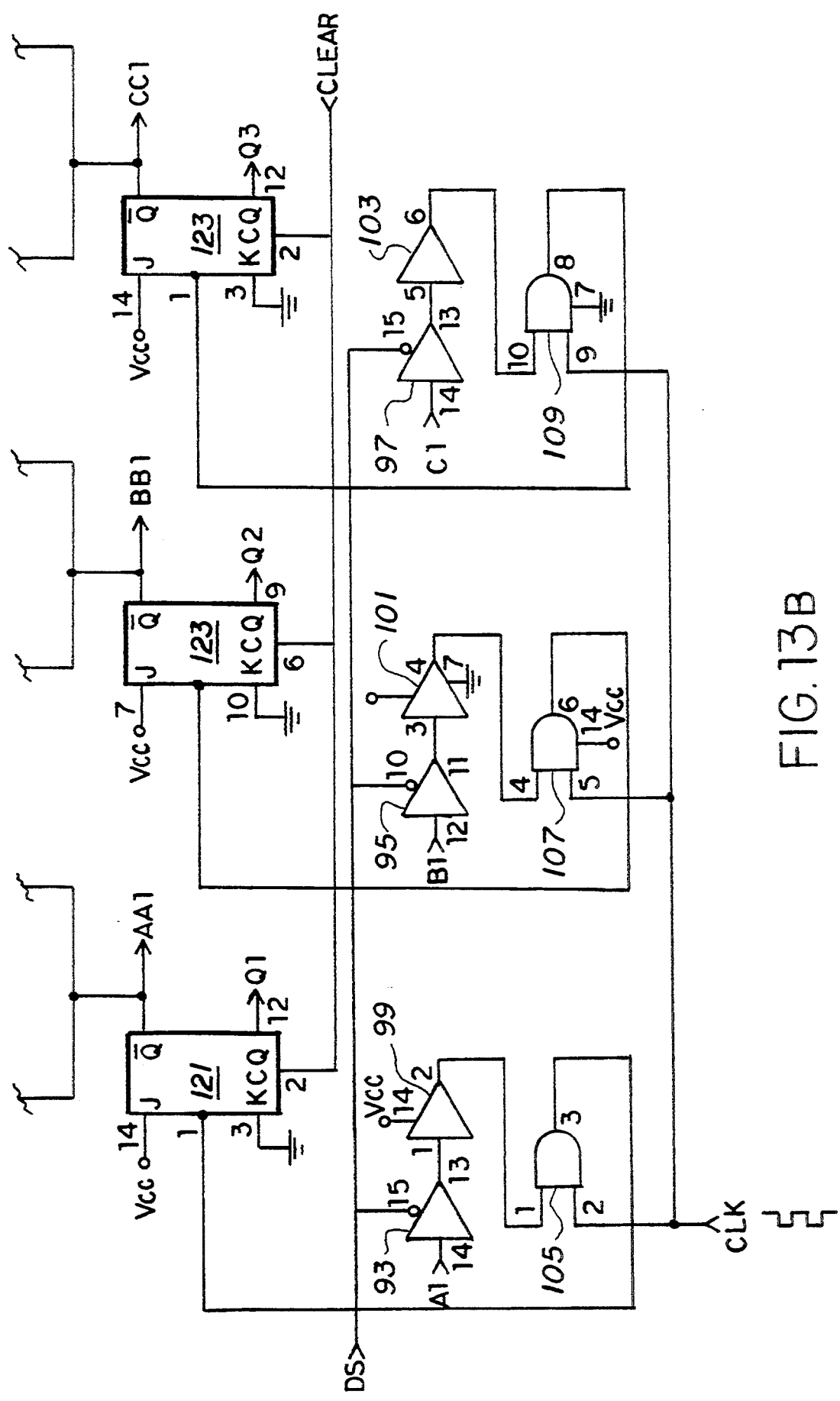

Components 93, 95, 97, 99, 103, 105, 107 and 109, to be de-described, are shown in FIG. 13. If button 33 (shown in FIG. 12) is pressed, the decoder 91 will select its corresponding latch, a 74367 hex 3-state buffer 93 (shown in FIG. 13). If button 35 is pressed, the decoder 91 will select a 74367 hex 3-state buffer 95. If button 37 is pressed, the decoder 91 will select a 74367 hex 3-state buffer 97. This causes the signal to go low. The signal for button 33 then goes into a 7404 hex inverter 99; for button 35, into a 7404 hex inverter 101; and for button 37, into a 7404 hex inverter 103. This causes the signal to go high. The high signal for button 33 goes into a 7408 quad 2-input AND gate 105; for button 35, into a 7408 quad 2-input AND gate 107; and for button 37, into a 7408 quad 2-input AND gate 109.

Figure 14:
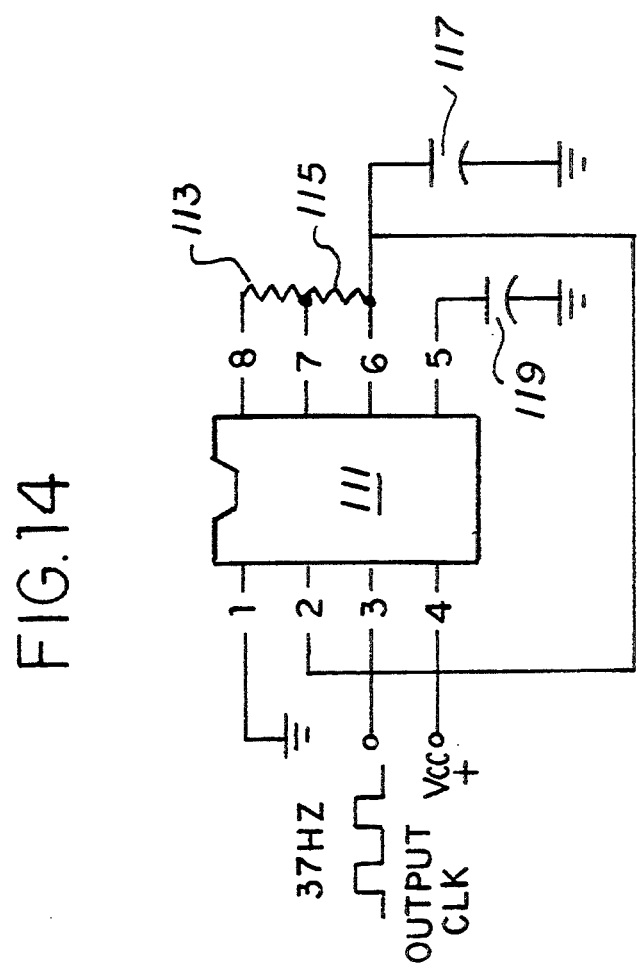
FIG. 14 is a diagram for the timing clock generator components.

Components 111, 113, 115, 117 and 119, to be described, are shown in FIG. 14. The signal passes through a 555 timer 111. The 555 timer 111 is grounded through a 300 k-ohm/¼-watt/5% tolerance resistor 113, a 200 k-ohm/¼-watt/5% tolerance resistor 115, a 0.22-micro farad/100-volt mylar capacitor 117 and another 0.22-micro farad/100-volt mylar capacitor 119.

Components 121, 123, 125, 127, 129, 131, 133, 135 and 137, to be described, are also shown in FIG. 13. The signal for button 33 then goes into a 7473 dual J–K flip flop 121; for button 35, into a 7473 dual J–K flip flop 123; and for button 37, into a 7473 dual J–K flip flop 125. The signal is then split into a high and a low. First, the low signal will cause a 7493 4-bit binary counter 127 and a 7493 4-bit binary counter 129 to output a low signal, producing the correct address for button 33. The low signal goes into a 7493 4-bit binary counter 131 and a 7493 4-bit binary counter 133 to produce the correct address for button 35. The low signal goes into a 7493 4-bit binary counter 135 and a 7493 4-bit binary counter 137 to produce the correct address for button 37. Another low signal from the flip flop 121 for button 33; flip flop 123 for button 35; and flip flop 125 for button 37 passes through a 7400 quad 2-input NAND gate 139

Figure 15:
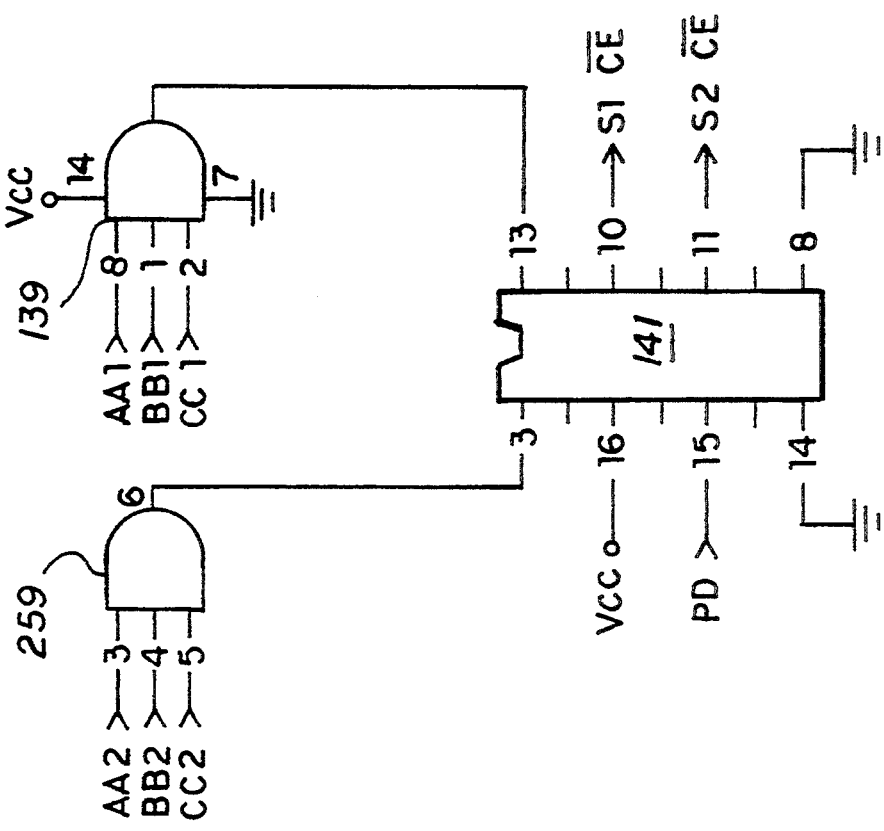
FIG. 15 is a diagram for the demultiplexer/decoder components.

(shown in FIG. 15) and into a 74155 dual 1-of-4 decoder 141 (shown in FIG. 15) which selects the 1000 A voice record/playback IC 143 (shown in FIG. 17) for buttons 33, 35 and 37.

Figure 16:
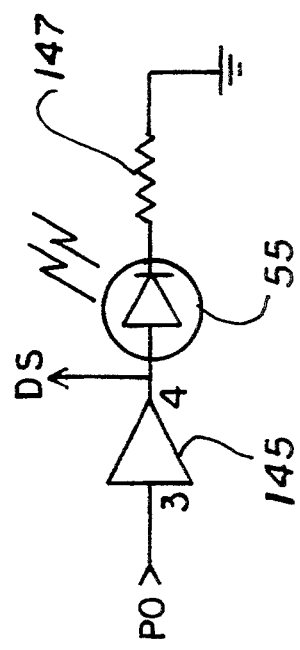
FIG. 16 is a diagram of the light emitting diode circuitry.
Figure 17A:
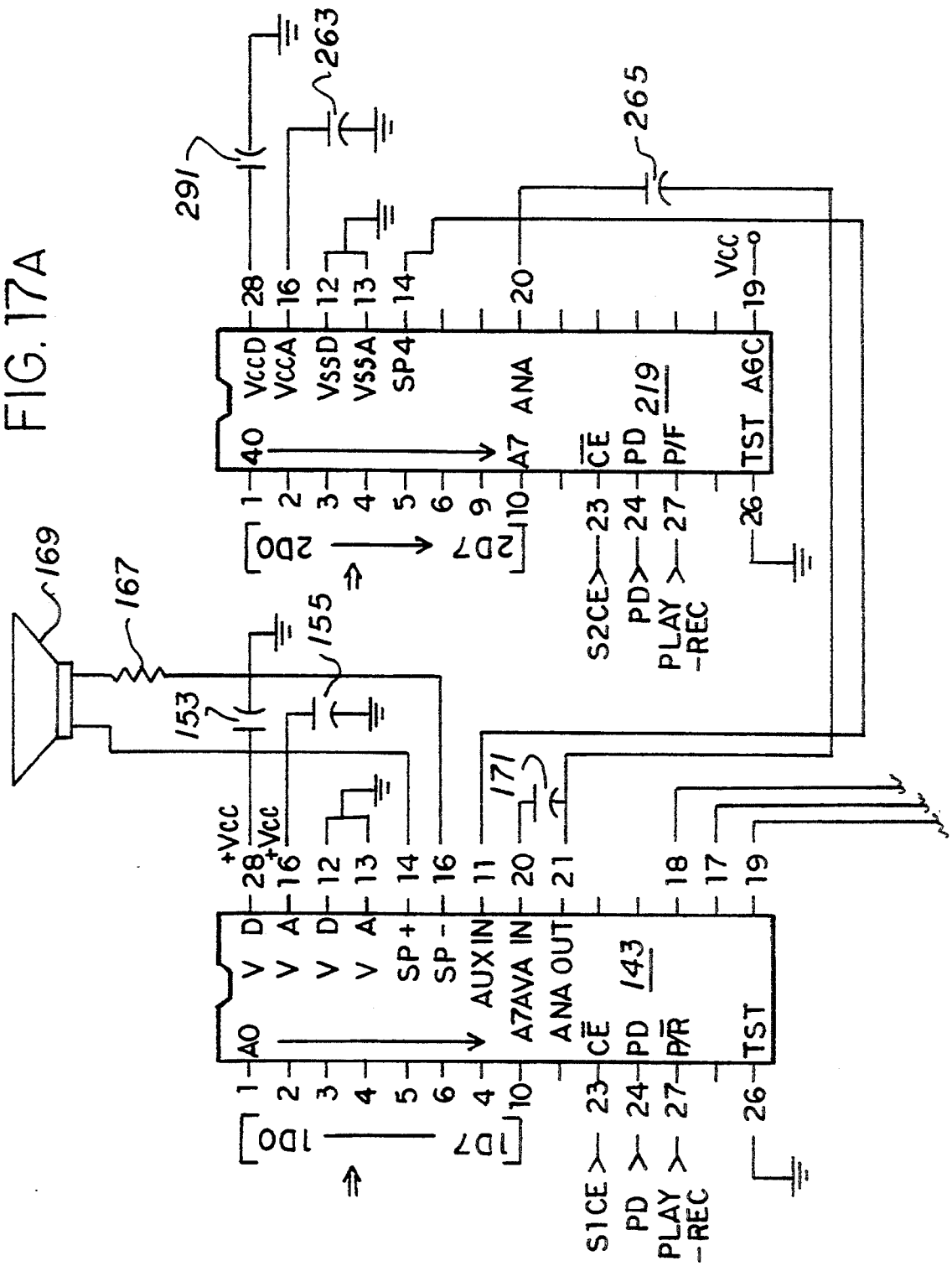
FIG. 17A and FIG. 17B is a diagram of the record/play circuitry, together with its speaker and microphone.
Figure 17B:
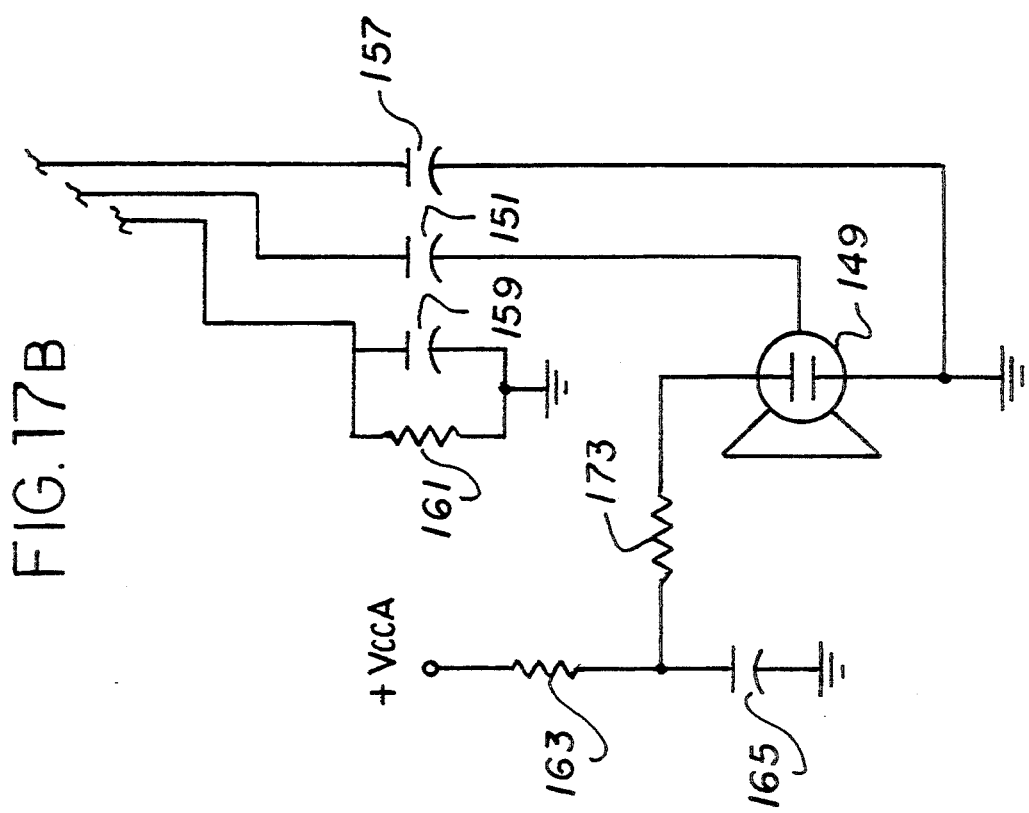

Components 145 and 147, to be described, are shown in FIG. 16. As soon as a signal enters the IC 143, a signal passes through a 7404 hex inverter 145 to light the LED 55 which is grounded through a 1 k-ohm/¼-watt/5% tolerance resistor 147. This will let the human operator know whether the device 1 is playing or recording. Component 143, as described, and components 149, 151, 153, 155, 157, 159, 161, 163, 165, 167, 169, 171 and 173, to be described, are shown in FIG. 17. The human operator then speaks into the microphone 149, sending the signal through a 0.22-micro farad/100-volt mylar capacitor 151. The signal is then stored into the IC 143. The IC 143 is grounded through a 22-micro farad/50-volt electrolytic capacitor 153, a 0.1-micro farad/100-volt mylar capacitor 155, a 0.22-micro farad/100-volt mylar capacitor 157, a 4.7-micro farad/50-volt electrolytic capacitor 159, a 470 k-ohm/¼-watt/5% tolerance resistor 161, a 2 k-ohm/¼-watt/5% tolerance resistor 163 and a 22-micro farad/50-volt electrolytic capacitor 165. The IC 143 is connected through a 10-ohm/¼-watt/5% tolerance resistor 167 to the speaker 169. The IC 143 has linked pins through a 1-micro farad/50-volt electrolytic capacitor 171. The microphone 149 is also grounded through a 10 k-ohm/¼-watt/5% tolerance resistor 173.

Figure 18A:
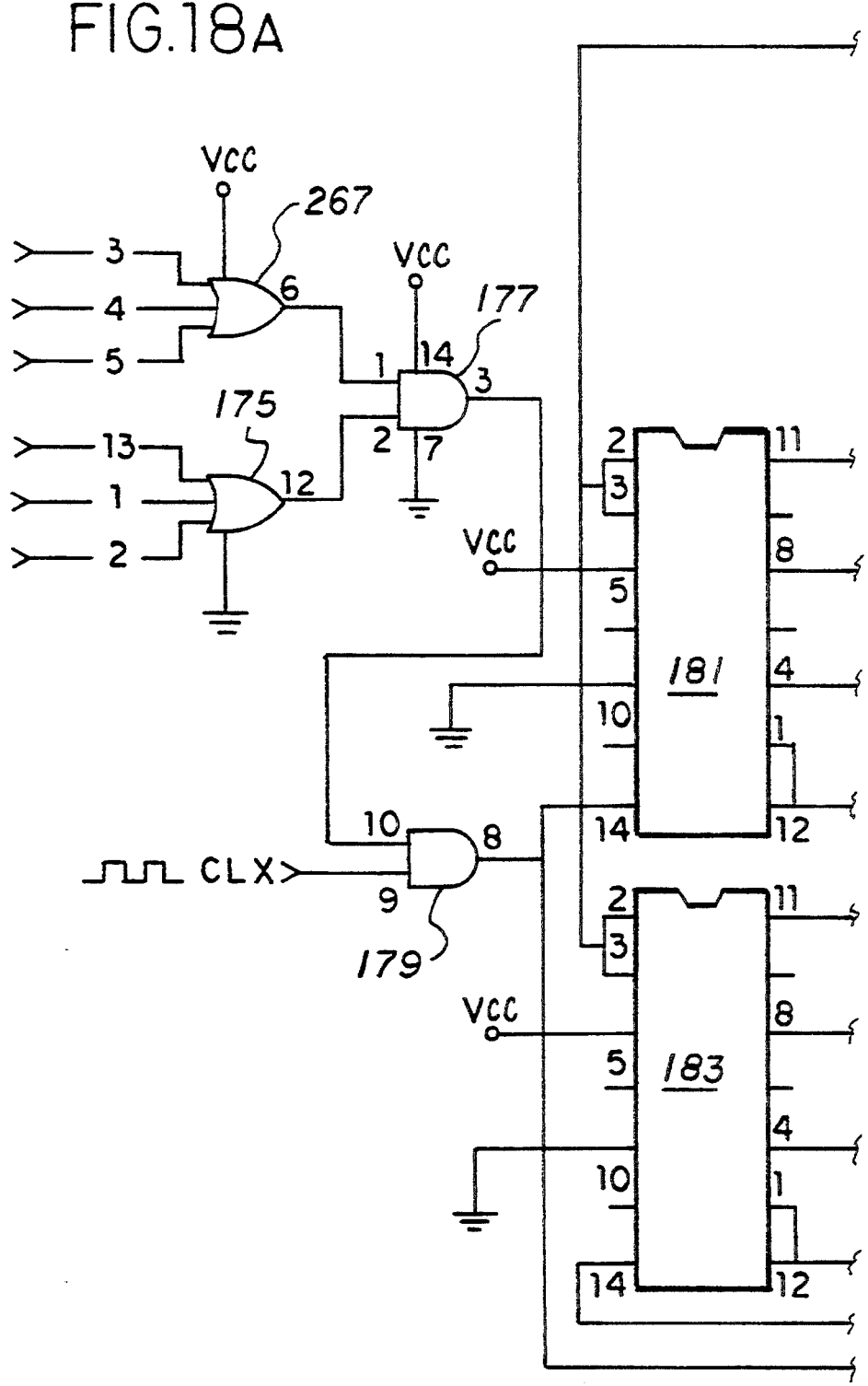
FIG. 18A and FIG. 18B is a diagram of the circuitry to produce CE pulse and power down.
Figure 18B:
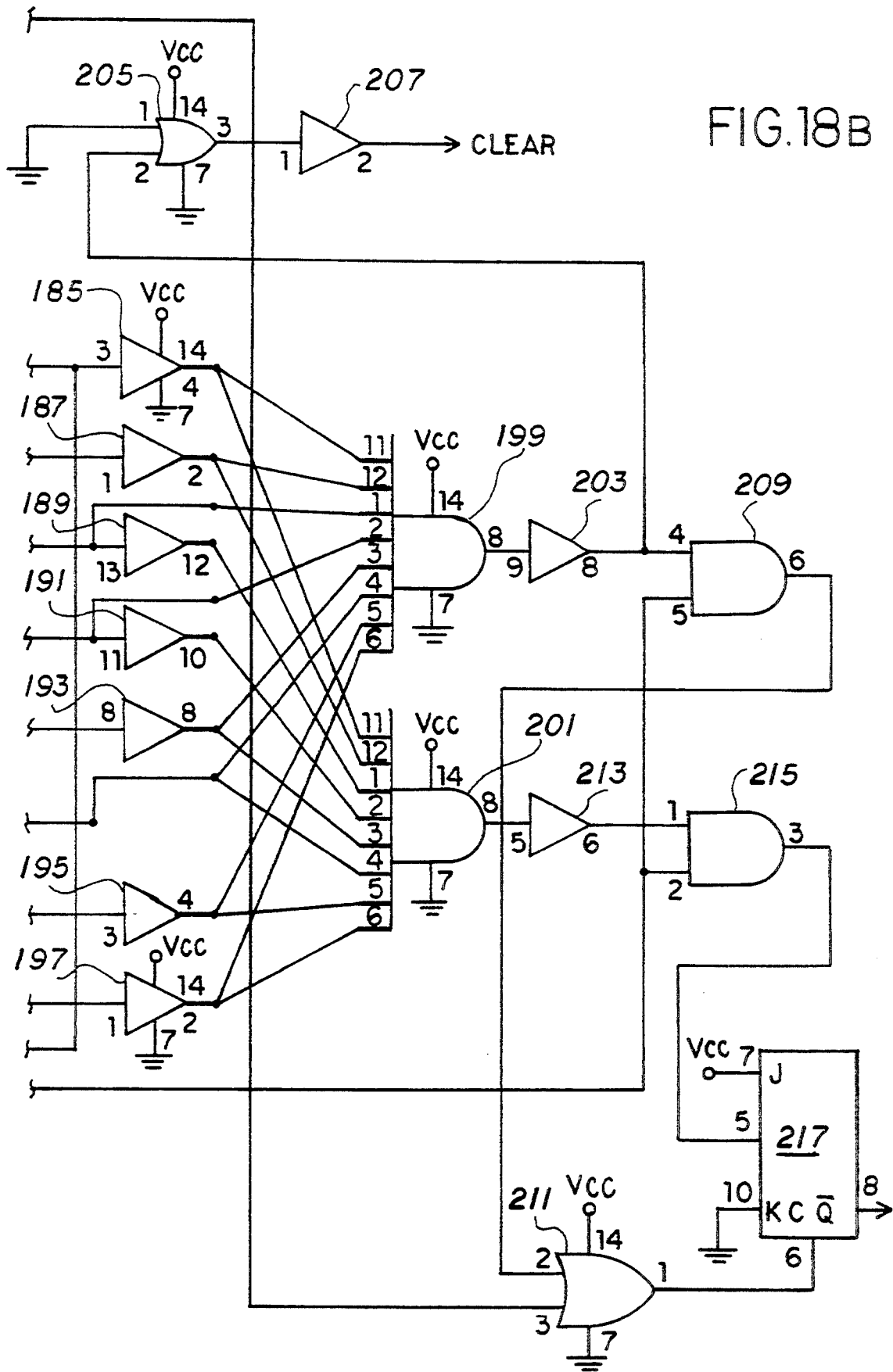

Components 175, 177, 179, 181, 183, 185, 187, 189, 191, 193, 195, 197, 199, 201, 203, 205, 207, 209, 211, 213, 215 and 217, to be described, are shown in FIG. 18. The high signal passes through a 7427 triple 3-input NOR gate 175 then through a 7410 triple 3-input NAND gate 177 and into a 7408 quad 2-input AND gate 179, passing the 555 timer 111 which starts the timing sequence. The high signal goes into a 7493 4-bit binary counter 181 which is cascaded with another 7493 4-bit binary counter 183. These binary counters 181 and 183 produce the correct starting and stopping signals. Each signal from the binary counters 181 and 183 pass through a series of 7404 hex inverters 185, 187, 189, 191, 193, 195 and 197, and into a 7430 8-input NAND gate start 199 and a 7430 8-input NAND gate stop 201. The signal from the NAND gate start 199 goes through a 7404 hex inverter 203 and splits. One signal goes to a 7493 4-bit binary counter 205 and through a 7404 hex inverter 207 to clear the J-K flip flops 121, 123 and 125 (shown in FIG. 13). The other side goes into a 7408 quad 2-input AND gate 209 then through a 7402 quad 2-input NOR gate 211. The signal from the NAND gate stop 201 goes to a 7404 hex inverter 213 and into a 7408 quad 2-input AND gate 215. Both the signals from the NAND gate start 199 and the NAND gate stop 201 go into a 7473 dual J-K flip flop 217 and is returned to the correct 1000 A voice record/playback IC 143 for buttons 33, 35 and 37 or IC 219 (shown in FIG. 17) for buttons 39, 41 and 43. For buttons 39, 41 and 43, when the circuit is closed, the signal goes into the 7442 one-of-ten decoder 221 (shown in FIG. 12). If button 39 is pressed, the decoder 221 will select its corresponding latch, the hex 3-state buffer 223.

Figure 19A:
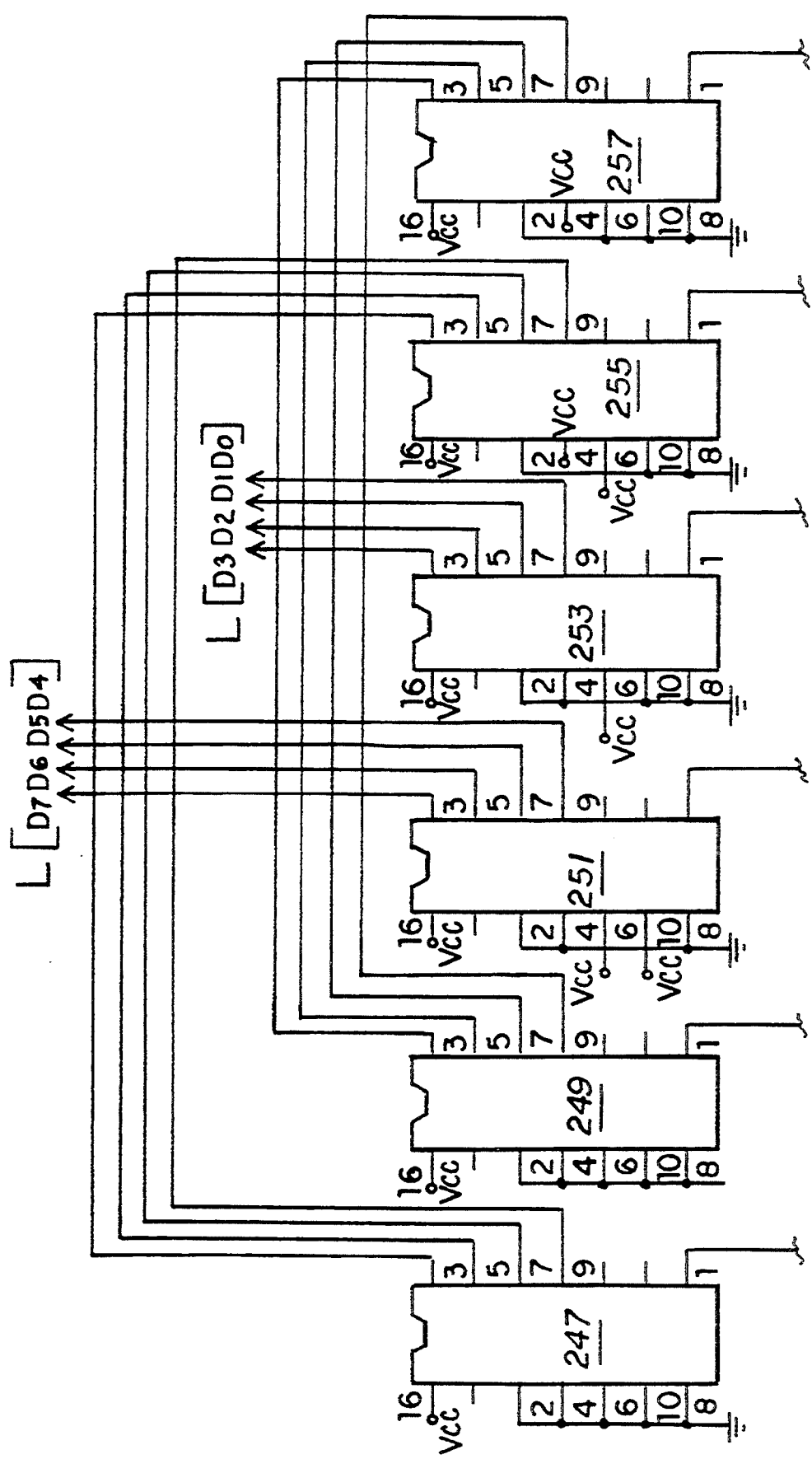
FIG. 19A and FIG. 19B is a diagram for the address data 2 and latch keyboard buttons 39, 41, 43.
Figure 19B:
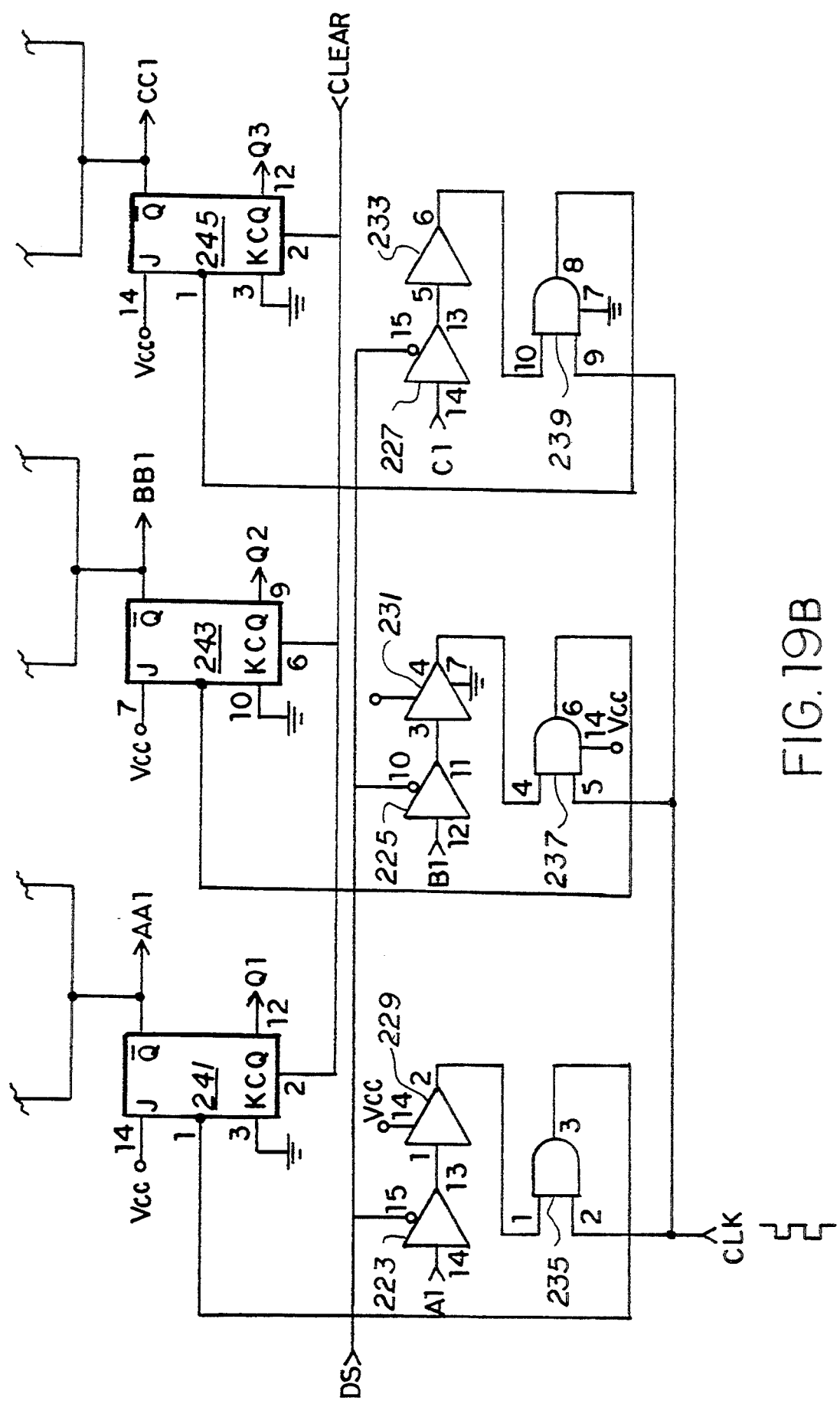

Component 223, as described, and components 225, 227, 229, 231, 233, 235, 237, 239, 241, 243, 245, 247, 249, 251, 253, 255 and 257, to be described, are shown in FIG. 19. If button 41 is pressed, the decoder 221 (shown in FIG. 12) will select the 74367 hex 3-state buffer 225. If button 43 is pressed, the decoder 221 will select the 74367 hex 3-state buffer 227, causing the signal to go low. The signal then goes into a 7404 hex inverter 229; for button 41, into a 7404 hex inverter 231; and for button 43, into a 7404 hex inverter 233; thus causing the signal to go high. The high signal for button 39 goes into 7408 quad 2-input AND gate 235; for button 41, into a 7408 quad 2-input AND gate 237; and for button 43, into a 7408 quad 2-input AND gate 239. The signal then passes through the 555 timer 111 (shown in FIG. 14). The signal for button 39 then goes into a 7473 dual J-K flip flop 241 (shown in FIG. 19); for button 41, into a 7473 dual J-K flip flop 243; and for button 43, into a 7473 dual J-K flip flop 245. The signal is then split into high and low signals. First, the low signal will cause a 7493 4-bit binary counter 247 and a 7493 4-bit binary counter 249 to output a low signal, producing the correct address for button 39. The low signal goes into a 7493 4-bit binary counter 251 and a 7493 4-bit binary counter 253 to produce the correct address for button 41; and the low signal goes into a 7493 4-bit binary counter 255 and a 7493 4-bit binary counter 257 to produce the correct address for button 43. Another low signal from the flip flop 241 for button 39; flip flop 243 for button 41; and flip flop 245 for button 43, passes through a 7400 quad 2-input NAND gate 259 (shown in FIG. 15) and into the 74155 dual 1-of-4 decoder 141 which selects the 1000 A voice record/playback IC 219 (shown in FIG. 17) for buttons 39, 41 and 43. As soon as a signal enters the IC 219, a signal passes through the 7404 hex inverter 145 to light the LED 55. The human operator speaks into the microphone 149, sending the signal through the 0.22-micro farad/100-volt mylar capacitor 151. The signal is then stored into the IC 219. The IC 219 is grounded through a 22-micro farad/50-volt eletrolytic capacitor 261, a 0.1-micro farad/100-volt mylar capacitor 263 and a 1-micro farad/50-volt electrolytic capacitor 265. The IC 219 is tied into the IC 143 and uses the same connections to play through the speaker 169. The high signal passes through a 7427 triple 3-input NOR gate 267 (shown in FIG. 18) following the same sequence as buttons 33, 35 and 37, starting with the 7410 triple 3-input NAND gate 177.

Figure 20:
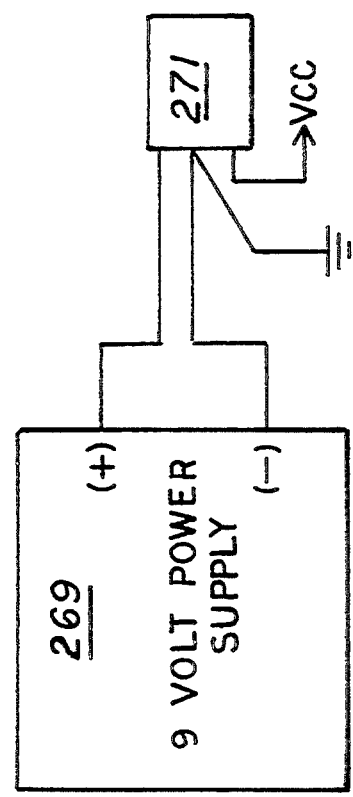
FIG. 20 is a diagram of the power supply components. In the "DETAILED DESCRIPTION OF THE PREFERRED EMBODIMENT", FIGS. 13A and B; 17A and B; 18A and B; 19A and B are referred to as FIGS. 13; 17; 18; and 19; respectively.

As shown in FIG. 20, the electronic circuitry of the device 1 is powered by a 9 volt power supply 269. The 9 volt power from the power supply 269 passes through a 7805 5 volt regulator 271 to regulate the voltage.

To playback a pre-recorded message, the human operator disposes the record/play switch 63 in its play position, causing the signal to reverse and go through the whole procedure again. The difference is the signal is returned high to the play input of the 1000 A voice record/playback IC's 143 and 219. When the corresponding button, which was recorded, is pressed again to play the message, the output of memory on the corresponding IC chips 143 or 219 is played through the speaker 169.

ELECTRICAL/ELECTRONIC PARTS SOURCES (A)=ARCHER/RADIO SHACK
(M)=MOTOROLA
(N)=NATIONAL SEMICONDUCTOR (A) 275-1547 for parts described by reference numerals 33, 35, 37, 39, 41, 43; (A) 276-044 for 55; (A) 275-625A for 63;
(A) 271-1325 for 79, 81, 83, 85, 87, 89; (M) SN54/74LS42 for 91, 221; (M)SN54/74LS367A for 93, 95, 97, 223, 225, 227;
(M) SN54/74LS04 for 99, 101, 103, 145, 185, 187, 189, 191, 193, 195, 197, 203, 207, 213, 229, 231,233; (M) SN54/74LS08 for 105, 107, 109, 179, 209, 215, 235, 237, 239; (N) LM555 for 111;
(A) 271-045 (3) for 113; (A) 271-045 (2) for 115; (A) 272-1070 for 117, 119, 151,157; (M)SN54/74LS73A for 121, 123, 217, 241, 243, 245; (M) SN54/74LS93 for 127, 129, 131,133, 135, 137, 181, 183, 205, 247, 249, 252, 253, 255, 257: (M) SN54/74LS00 for 139, 259; (M) SN54/74LS155 for 141; (A) 276-1325 for 143, 219;
(A) 271-1321 for 147; (A) 270-092B for 149; (A) 272-1026 for 153, 165, 261; (A) 272-1069 for 155, 263; (A) 272-1024 for 159;
(A) 271-053 for 161; (A) 271-023 (2) for 163; (A) 271-1301 for 167; (A) 40-248 for 169; (A) 272-996 for 171,265; (A) 271-1335 for 173; (M) SN54/74LS27 for 175, 267; (M) SN54/74LS10 for 177;
(M) SN54/74LS30 for 199, 201; (M) SN54/LS02 for 211; (A) 23-665 for 269; and (A) 276-1660 for 271.

We claim:

1. An educational device for a five to nine months old baby including in combination:

a housing having a horizontal top portion;

first means mounted in the housing for storing and reproducing a plurality of separate and distinct, single-subject, pre-recorded audio messages each recorded by an immediate family member of the baby;

a plurality of separate and distinct actual photos, recognizable to the baby in and from the baby's own immediate-family environment, each photo being a single subject separately and distinctly corresponding to the respective pre-recorded messages;

a plurality of soft-touch buttons and switch-actuator members, the soft-touch buttons being horizontally disposed and mounted on the horizontal top portions of the housing, each soft-touch button being operatively associated with a corresponding switch-actuator member, a prerecorded audio message and a single-subject photo, each switch-actuator member being capable of actuation by slight pressure being applied to its corresponding soft-touch button;

power supply means;

each photo being disposed upon the housing's top portion in superposed relationship with respect to its own corresponding and associated soft-touch button;

a plurality of switch means each controlled by a different one of the switch-actuator members and electrically interconnecting the first means and the power supply means to cause the first means to reproduce a selected one of the pre-recorded audio messages corresponding to a selected switch-actuator member by slight pressure, applied to its corresponding superposed photo and transmitted thereby through its corresponding soft-touch button and to its corresponding switch-actuator member;

wherein the separate and distinct, single-subject actual photos can be changed to new and different separate and distinct, single-subject actual photos, recognizable to the baby in and from the baby's own immediate-family environment, and wherein said first means inclusively allow the separate and distinct, single-subject, prerecorded audio messages, each of which was recorded by an immediate family member of the baby, to be changed to new and different, separate and distinct, single-subject, recorded audio messages that correspond to the respective new and different photos;

the device allowing immediate family mambers of the baby by repetitive pressing of the photos with reproductions of their respective corresponding prerecorded audio messages to accelerate the baby's learning from the baby's recognition, language acquisition, awareness of cause and effect, and association, and affording a providing a synergistic effect thereby from the accelerating and compounding interplay from the baby's recognition, language acquistion, awareness of cause and effect, and association, for further beneficially accelerating the baby's own learning to the degree that the baby himself will induce himself and teach himself to press the photos to thereby accelerate his own learning.

2. The combination in accordance with claim 1, wherein the housing's top portion has raised picture wells each receiving a photo for emplaced relationship thereon.

3. The combination in accordance with claim 2, wherein the housing's top portion has a picture retaining cover, wherein the housing's top portion and its picture retaining cover have cooperating means for opening the retaining cover for emplacement of the photos upon the raised picture wells and for closing the retaining cover to retain the photos thusly emplaced upon the picture wells.

* * * * *